Nov. 7, 1944.    A. BOYNTON    2,361,924
ATMOSPHERIC RESISTANCE EQUALIZING MEANS FOR MOVING VEHICLES
Filed April 20, 1943

ALEXANDER BOYNTON,
INVENTOR,
BY
Albert B. Dieterich
ATTORNEY.

Patented Nov. 7, 1944

2,361,924

UNITED STATES PATENT OFFICE 2,361,924

ATMOSPHERIC RESISTANCE EQUALIZING MEANS FOR MOVING VEHICLES

Alexander Boynton, San Antonio, Tex.

Application April 20, 1943, Serial No. 483,789

8 Claims. (Cl. 296—1)

My invention relates to reducing atmospheric resistance to rapidly moving automobiles and other vehicles.

The principal object is to shunt the impacted atmosphere from the front end of a rapidly moving vehicle to the rear end thereof, in order to reduce or overcome the partial vacuum ordinarily developed behind the vehicle.

Another object is to neutralize the suction ordinarily developed behind automobiles in motion, thus obviating the raising of clouds of dust.

Another object is to employ compressed air from the front end of rapidly moving vehicles to force mud thrown by the rear wheels back to the ground.

Another object is to decrease the danger of skidding by increasing the atmospheric pressure upon the rear of automobiles; thereby increasing the traction of the rear wheels.

Still another object and advantage is to conserve motor fuel in the propulsion of automobiles and other fastly moving conveyances.

A final object and advantage is to enable mass formations of motor driven vehicles in warfare to move over dusty and muddy terrains with a minimum of hindrance to visibility and without unnecessarily disclosing information of value to the enemy.

The streamline development of automobiles, aeroplanes, and railway trains is a matter of common knowledge and universal observation during the past few years. A man walking against high wind crouches and holds his arms in front to minimize atmospheric resistance. A bird in flight extends his legs backward. A raindrop is streamlined in falling. Its long tapered upper end defines the zone of vacuum influence created behind it.

The resistance offered by the atmosphere to rapidly moving vehicles has been observed by everyone who has thrust his arm out through a window when moving at high speed. The great force exerted upon such an outthrust arm is twofold: first, the compressed air upon the forward side and, second, the partial vacuum behind it, each of substantially equal force.

When such dual forces, one tending to push a rapidly moving vehicle backward and the other tending to pull it backward, are computed in terms of the comparatively large areas involved, the great force of atmospheric resistance is manifest; resulting in little wonder that the perpendicular front and rear ends of such vehicles of a decade ago are becoming more and more streamlined now as each new model appears.

The cyclone has been always one of the most destructive manifestations of nature, and yet as man developed vehicles with speed enough to have cyclonic contact with the atmosphere, it is only recently that manufacturers have seemed to realize the importance of shielding vehicles from the atmospheric tempest created by great velocities. Automobiles long were designed to have no protection from atmospheric forces which they created and had to encounter, while their makers dug storm cellars to hide in when nature developed similar manifestations.

Experiments have proven that wind moving at 50 miles per hour exerts a force of approximately one-tenth pound per square inch. At 75 miles per hour this force increases to about one-fifth pound, and at around 100 miles per hour, wind force rises to slightly more than one-third pound per square inch.

It may be assumed that different makes and types of automobiles have 3000 to 4000 square inches of frontal contact with the atmosphere. At ordinary high speeds the compression in front often will be one-fourth pound per square inch and the suction behind will be approximately the same. Under such conditions 1500 to 2000 pounds of force is retarding progress of the particular vehicle. For higher speeds, the atmospheric resistance increases substantially in proportion to the square of the increase of the velocity. In driving against strong winds this resistance will be increased very greatly.

A certain atmospheric compression is unavoidable in front of all fast moving vehicles, but the force of such compression does not have to be wasted. It can be employed to reduce the effect of the partial vacuum at the rear.

I reduce the atmospheric resistance to moving vehicles by trapping the air compressed in front of them and transferring this compressed air into the zone of partial vacuum behind the vehicles, as will appear more fully from the following specification and the accompanying drawing, in which Fig. 1 is a front end elevation of an automobile equipped with the preferred embodiment of the resistance reducing or equalizing means.

Similar reference characters are employed to designate similar parts throughout the several views of each embodiment.

Figure 1:
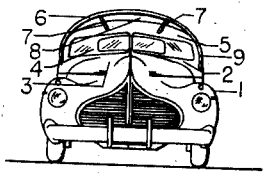

In Figs. 1 through 5 illustrating the preferred construction, I show the top 5 of the automobile 1 supporting the deflector hood 6 by means of the anchoring strips 7, the lateral edges of the hood being fastened also to the top. The pressure equalizing passage 8 is formed between the top 5 and the deflector hood 6.

When the automobile is moving forward, air will be diverted against the windshield 4 by the engine hood 3 and the frontal surface 2. The front portion of the deflector hood 6, which extends somewhat forward of the windshield 4, is aided by the pair of deflector plates 9, which plates may be forward extensions to the hood 6, in forcing the air compressed in front of the windshield into the pressure equalizing passage 8.

If it were not for the front portion of the deflector hood 6 and the deflector plates 9, the air compressed in front of the windshield, in all herein shown forms of the invention, would be deflected upward from the automobile in the direction indicated by the arrow 10. The force of the air so deflected would be wasted. But by the simple deflector means shown, this compressed air is forced through the passage 8, whence it is discharged behind the automobile, as indicated by the arrows 11, where it tends to overcome the partial vacuum which would otherwise obtain there.

Figure 2:
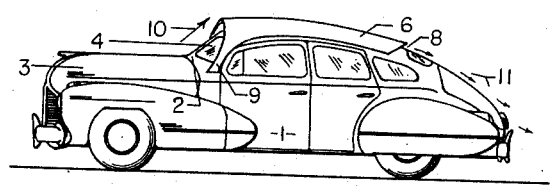
Fig. 2 is a side elevation of the automobile and the resistance reducing or equalizing means shown in Fig. 1.
Figure 7:
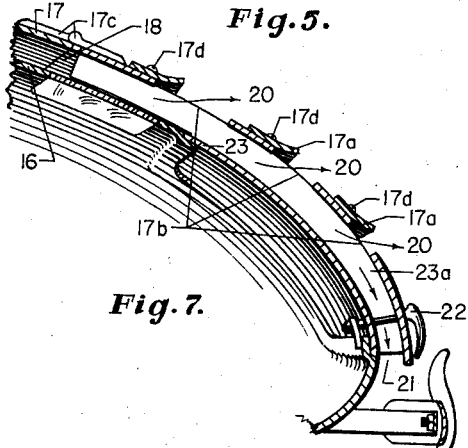
Fig. 7 is an enlarged partial longitudinal section through the pressure equalizing means shown in Fig. 6.
Figure 6:
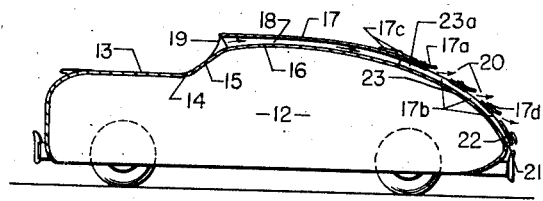
Fig. 6 is a longitudinal section through the first modified form of the pressure resistance equalizing means and the automobile upon which the same is installed, this view being taken on about the same plane as the showing of Fig. 4.

In Figs. 6 and 7, illustrating the first modification of the invention, the air deflected by the engine hood 13, the frontal surface 14, and the windshield 15 of the automobile 12 is diverted through the pressure equalizing passage 18 formed between the top 16 of the automobile and the deflector hood 17, this hood being secured upon the top by anchoring strips in the same manner as the deflector hood 6 in Fig. 2 is secured upon the top 5.

The front portion of the deflector hood 17 extends forward of the windshield 15, in order to trap the air compressed by the windshield and force it through the pressure equalizing passage 18. The pair of deflector plates 19, which may be secured upon the sides of the automobile, extend forward of the windshield also, in order to cooperate with the front portion of the deflector hood 17 in forcing the air from the front of the windshield to pass rearward through the passage 18.

The downwardly inclined rear portion of the hood 17, which may be hinged at 17c and secured by the lock 22, has the transverse intermediate discharge openings 17b adapted to discharge to atmosphere a portion of the compressed air from the passage 18. These discharge openings may be increased or decreased by means of the closure slides 17a, which preferably should be slotted to receive bolts or screws 17d for providing such adjustments.

All compressed air from the passage 18 which is not discharged through the intermediate discharge openings 17b, as indicated by the arrows 20, will be discharged through the rearmost discharge opening 21 behind the lower portion of the automobile.

In order to provide entrance means for the rear part of the automobile, the door 23 is provided upon the hinged portion of the deflector hood 17 and supported thereon by the weldedly connected longitudinal ribs or plates 23a. The hinge 17c affords means for opening and closing the door which may be releasably secured by the lock 22.

Manifestly the size and design of the automobile or other vehicle will determine the proper size for the intermediate discharge openings 17b.

Figure 9:
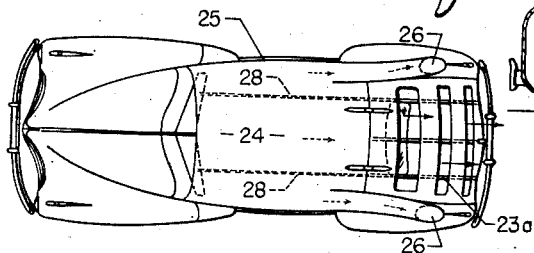
Fig. 9 is a top plan view of Fig. 8.
Figure 8:
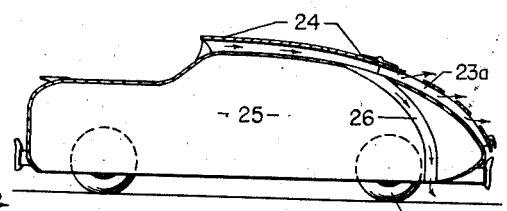
Fig. 8 is a longitudinal section through the center of the second modified form of the pressure resistance equalizing means and the automobile upon which the same is installed, this view also being taken on a plane corresponding to the showing of Fig. 4.

In Figs. 8 and 9 illustrating the second modification of the invention, the air deflector means, as shown in Fig. 6 and indicated generally at 24, is understood to be secured upon the automobile 25 in the same manner as was stated in connection with the preceding embodiments.

Figure 3:
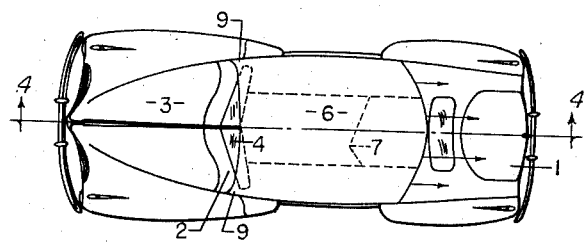
Fig. 3 is a top plan view of Figs. 1 and 2.
Figure 5:
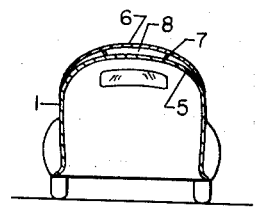
Fig. 5 is a cross section on the line 5—5, Fig. 4.
Figure 4:
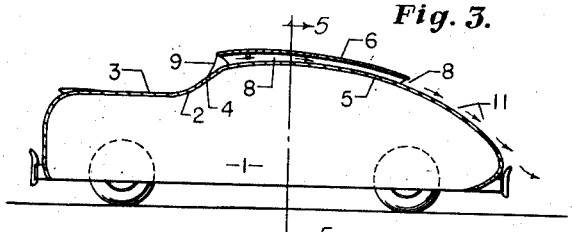
Fig. 4 is a longitudinal section taken substantially on the plane of the line 4—4 through the center of Fig. 3.

The only difference between the construction illustrated in Fig. 6 and that of Figs. 8 and 9 resides in the air conduits 26 leading out of the lateral compartments formed by the anchoring strips 28, which strips secure the deflector hood upon the top in the same manner as the anchoring strips 7 are employed in Figs. 1, 3 and 5.

The air conduits 26 discharge compressed air out of the deflector means 24 to atmosphere immediately behind the rear wheels 27, in order to counteract the partial vacuum naturally formed behind these wheels and thereby prevent suction from raising unnecessary dust and also to force to the ground mud flying from said wheels.

All compressed air in the deflector means 24 which is not diverted into the conduits 26 is discharged behind the automobile in the same manner as was stated in connection with Fig. 6.

Manifestly the compressed air discharged through the rearmost opening 21 in Fig. 6 will tend to accomplish the same dust-preventing and mud-laying function as that of the air conduits 26 in Figs. 8 and 9.

While I have illustrated the invention as applied to automobiles, it will be understood that obvious modifications thereof are equally adaptable for use upon railway trains and all other fast moving vehicles.

A great portion of the earth being desert and semi-arid where caravans of vehicles in close proximity often move, the importance of this invention as illustrated and described in the second embodiment, is emphasized. The same also applies to the greater portion of the world's roads in general, only a small portion of which have yet been paved.

On the other hand, the invention as a fuel-saving means is of greater importance in the more highly developed countries, where better roads induce greater speed in travel.

Manifestly one or more fans may be employed in front of the pressure equalizing passage, within it or behind it, to provide an additional or auxiliary volume of air passing therethrough. Said auxiliary air means would provide such variation in the air supply rearward of the vehicle to enable the operator to more nearly equalize forward and rearward air pressures for laying dust and suppressing flying mud in particular. Such fan means are not illustrated in the drawing, because no inventive skill would be required to install the same.

While I have shown and described the preferred embodiment of my invention and such few modifications thereof as may be set out within the limits of a patent, it will be understood that the same are illustrated examples only and are not intended to limit variations in the construction and other apparent uses of the device, which may be employed to diminish atmospheric resistance to all kinds of fast moving vehicles.

I claim:

1. As an atmospheric pressure equalizing means for a vehicle having a windshield, a tonneau, and a top: a deflector hood on said top and spaced therefrom to form a pressure equalizing passage between said hood and top, said passage extending the length of said top, said hood having an extension forward of said windshield and intermediate discharge openings; deflector plates adapted to cooperate with said forward extension to force air through said passage as said vehicle moves forward; closure slides adapted to adjust the size of said discharge openings; a hinge in the rear portion of said deflector hood, said hood being in two parts joined by said hinge; and a door upon the rear portion of said hood and adapted to close an opening in said tonneau.

2. As an atmospheric pressure equalizing means for moving vehicles having a windshield and a top: a deflector hood on said top and spaced therefrom to form a pressure equalizing passage between said hood and top, said passage extending the length of said top, said hood having an extension forward of said windshield and intermediate discharge openings; deflector plates adapted to cooperate with said forward extension to force air through said passage as said vehicle moves forward; and closure slides adapted to adjust the size of said discharge openings.

3. As an atmospheric pressure equalizing means for moving vehicles having a windshield and a top: a deflector hood on said top and spaced therefrom to form a pressure equalizing passage between said hood and top, said passage extending the length of said top, said hood having an extension forward of said windshield and intermediate discharge openings; and deflector plates adapted to cooperate with said forward extension to force air through said passage as said vehicle moves forward.

4. As an atmospheric pressure equalizing means for moving vehicles having a windshield and a top: a deflector hood on said top and spaced therefrom to form a pressure equalizing passage between said hood and top, said passage extending the length of said top, said hood having an extension forward of said windshield and intermediate discharge openings.

5. As an atmospheric pressure equalizing means for a vehicle having a windshield, a tonneau, and a top: a deflector hood on said top and spaced therefrom to form a pressure equalizing passage between said hood and top, said passage extending the length of said top, said hood having an extension forward of said windshield and intermediate discharge openings; deflector plates adapted to cooperate with said forward extension to force air through said passage as said vehicle moves forward; closure slides adapted to adjust the size of said discharge openings; a hinge in the rear portion of said deflector hood, said hood being in two parts joined by said hinge; a door upon the rear portion of said hood and adapted to close an opening in said tonneau; and conduits leading out of said pressure equalizing passage to proximately behind the rear wheels of said vehicle.

6. As an atmospheric pressure equalizing means for a vehicle having a windshield and a top; a deflector hood on said top and spaced therefrom to form a pressure equalizing passage between said hood and top, said passage extending the length of said top, said hood having an extension forward of said windshield and intermediate discharge openings; deflector plates adapted to cooperate with said forward extension to force air through said passage as said vehicle moves forward; closure slides adapted to adjust the size of said discharge openings; and conduits leading out of said pressure equalizing passage to proximately behind the rear wheels of said vehicle.

7. As a means tending to equalize atmospheric pressure in front of and behind moving vehicles: a deflector hood in spaced relation to said vehicle and forming a pressure equalizing passage therewith; means for forcing air through said passage by the movement of said vehicle; and conduits leading out of said pressure equalizing passage to proximately behind the rear wheels of said vehicle.

8. As an atmospheric pressure equalizing means for moving vehicles having a windshield and a top; a deflector hood on said top and spaced therefrom to form a pressure equalizing passage between said hood and top, said passage extending the length of said top, said hood having an extension forward of said windshield and intermediate discharge openings; and conduits leading out of said hood to approximately a position behind the rear wheels.

ALEXANDER BOYNTON.